United States Patent [19]
Ketonen

[11] Patent Number: 4,735,049
[45] Date of Patent: Apr. 5, 1988

[54] OPERATING SYSTEM FOR A TREE HARVESTER

[76] Inventor: Lauri Ketonen, Lappväärtintie 13 C 7, SF-64120 Kristinankaupunki, Finland

[21] Appl. No.: 830,425
[22] PCT Filed: May 21, 1985
[86] PCT No.: PCT/FI85/00045
§ 371 Date: Jan. 10, 1986
§ 102(e) Date: Jan. 10, 1986
[87] PCT Pub. No.: WO85/05412
PCT Pub. Date: Dec. 5, 1985

[30] Foreign Application Priority Data
May 21, 1984 [FI] Finland .................................. 842024

[51] Int. Cl.⁴ ............................................. A01G 23/08
[52] U.S. Cl. .......................................... 60/484; 60/470; 60/493; 144/3 D
[58] Field of Search ................ 60/484, 487, 470, 471, 60/472, 493; 91/420; 144/2 Z, 3 D, 34 R

[56] References Cited
U.S. PATENT DOCUMENTS

| | | | |
|---|---|---|---|
| 3,304,633 | 2/1967 | Heinz et al. | 60/471 X |
| 3,512,453 | 5/1970 | Bayer | 60/471 X |
| 3,939,856 | 2/1976 | Tucek | 60/484 X |
| 4,226,270 | 10/1980 | Sturtz, Jr. et al. | 144/3 D X |
| 4,368,763 | 1/1983 | Eaton | 144/3 D X |
| 4,431,064 | 2/1984 | Bright | 60/484 X |

Primary Examiner—A. Michael Chambers
Assistant Examiner—John C. Fox
Attorney, Agent, or Firm—Biebel, French & Nauman

[57] ABSTRACT

A tree-harvester operating system for controlling in particular the tree-feeder motors (5), the crosscut saw (6) and the cylinder (18) operating the function of the feeder and the limbing blades, especially in grapple processors. A simple operating system has been achieved by taking advantage of a two-direction feeding of pressurized oil by means of two delivery lines (2) and (3). By preventing the rotation of the tree-feeder motors (5) and by allowing at this time only one flow direction of pressurized oil to the crosscut saw, it has thus been possible to utilized the pressurized oil drive opposite to this flow direction of the saw (6) separately for the cylinder (18) which operates the function of the feeder and the limbing blades, the direction of movement of the cylinder (18) depending on the position of valve (15).

4 Claims, 1 Drawing Sheet

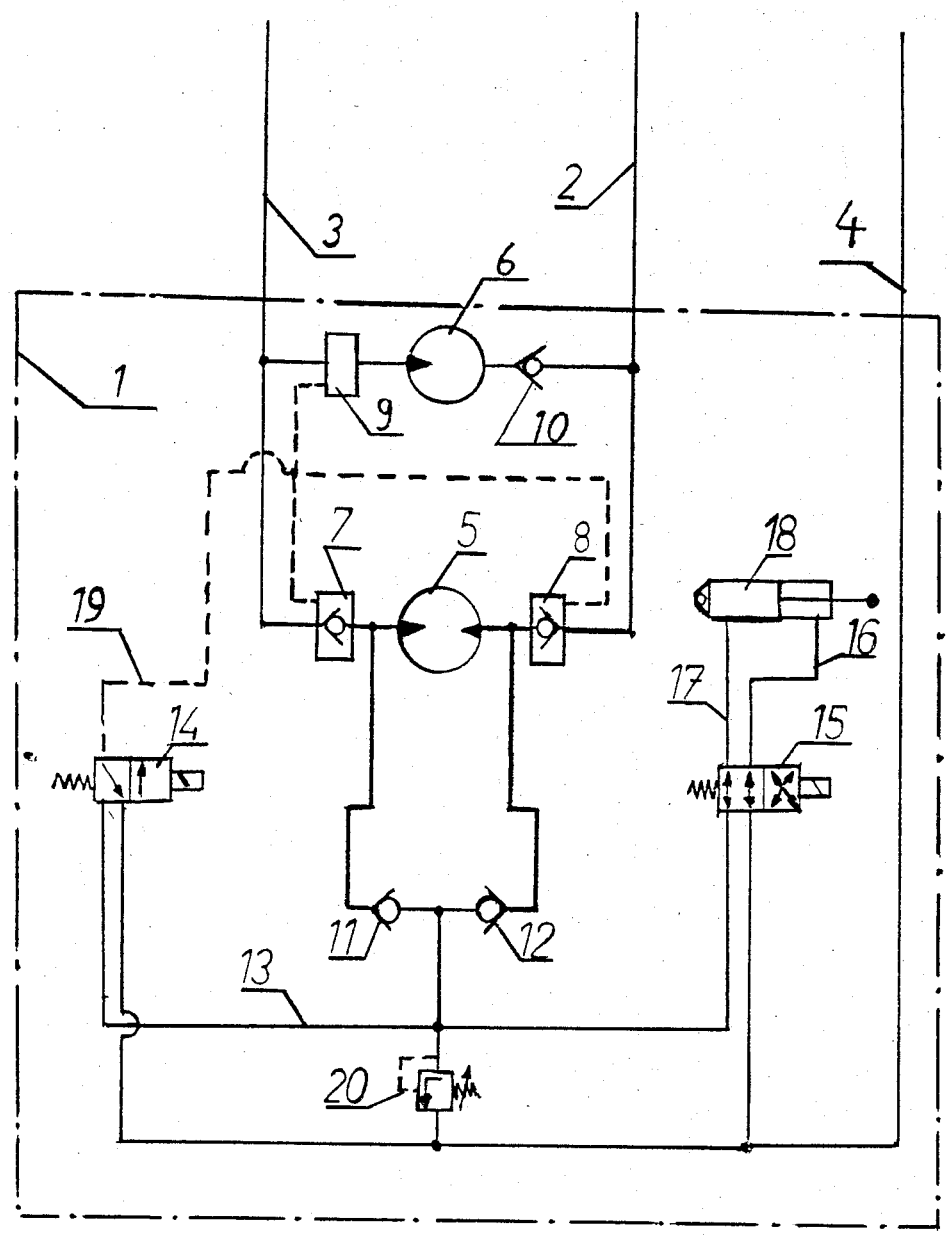

OPERATING SYSTEM FOR A TREE HARVESTER

TECHNICAL FIELD

The present invention relates to an operating system for a tree harvester, specifically a grapple processor. The operating system is used for controlling and operating the hydraulic motors of the tree feeder and the crosscut saw and further the hydraulic cylinders required by the operation of the feeder and the limbing blades.

STATE OF THE ART

Previously the control and operating valves in a processor were placed in the power take-off machine itself. In such a case, separate hydraulic lines for all functions were directed via the loading jibs. But in such a case at least six hydraulic lines from the basic machine to the processor are required. Thus a tree harvester, intended as an accessory, was not easy to install even in terms of the lines alone, not to speak of the installation of many new additional valves in the power take-off machine.

Nowadays the aim is to place the processor control valves in the processor itself, but it is necessary to use large-sized valve groups for the control of the necessary hydraulic operations. This for its part increases the weight of the equipment and requires several electrical cables between the power take-off machine and the tree harvester.

Furthermore, these control valves implemented using conventional technology usually require a constant-pressure pump, and soft control of these valves with so-called on-off valves is not possible. Likewise, it is difficult to place in the driver's cabin of the power take-off machine the control levers required by the plurality of functions.

In grapple processors, hydraulics is required during the limbing movement, i.e. the feeding of the tree, for the crosscut saw, and also for pressing the rolls or rollers of the feeder against the tree. In general, the operating movements of the limbing blades are also in the same circuit, i.e. when the feeder is pressed against the tree also the limbing blades move towards the tree. In several grapple processors these have a common double-acting hydraulic cylinder.

TECHNICAL PROBLEM AND ITS SOLUTION

A grapple processor thus requires at least one hydraulic motor for the feeding of the tree. This motor must be able to rotate in both directions. Furthermore, the crosscut saw requires pressurized oil in order to rotate in one direction. This operation takes place always at a time different from the time of the feeding in of the tree. Thus, for gripping the tree and for the limbing blades at least one double-acting hydraulic cylinder is required. By means of this cylinder the pulling rolls and the limbing blades are pressed against the tree. The feeding of the tree and the crosscut saw require pressurized oil about 150 l/min, whereas the cylinder of the feeder and the limbing blades requires only about 30 l/min for the on-off action. During limbing, as the diameter of the tree varies, the cylinder needs pressurized oil only to keep the feeder rolls and the limbing blades pressed against the tree, the pressurized-oil requirement being only about 10 l/min.

In the operating system according to the invention, advantage is taken of the unidirectional pressurized-oil requirement of the saw motor, whereupon all the functions of the grapple processor can be realized simply by utilizing the reversing valve in the power take-off machine. This valve may be, for example the on-off direction control valve of the timber grapple, the valve becoming free when the grapple is replaced by a processor. In this case the controlling of the entire processor requires only two pressurized-oil lines dimensioned for actual power transmission between the power take-off machine and the processor. A third line is required for the return oils of the control valves and the feeder and the limbing blades. In this line the flow volume is low. Furthermore, two separate electromechanical small direction-control valves are required; one controls the pressure of the pulling rolls and the limbing blades and the other controls the on-off valves of the tree feeder motors and the saw motor. Two electrical cables between the power take-off machine and the processor suffice for the control of these electromechanical direction-control valves, since the metal frame structures can serve as the grouding wire.

By adding only two small electric switches in conjunction with the on-off direction-control valve of the timber grapple in the power take-off machine and by adding between the power take-off machine and the processor one return-oil line, described above, in addition to the two electrical cables, most power take-off machines can be used as the power take-off machine for the grapple processor, without any other changes in the hydraulics. The valves placed in the processor part may all be so-called on-off valves, since the speed of the operations is controlled by means of the direction-control valve in the power take-off machine.

DRAWING

The accompanying drawing depicts diagrammatically the operating system according to the invention.

PREFERRED EMBODIMENT

As is evident from the FIGURE, hydraulic-oil lines 2 and 3 and return-oil line 4 lead from the power take-off machine to the tree harvester 1. Line 2 connects valves 8 and 10. Line 3 connects valves 7 and 9. Line 4 connects the return lines of valves 14 and 15. Line 13 connects valves 14 and 11 and 20. Working pressure from line 2 or 3 acts on line 13 by transmission of valves 7, 8, 11 and 12.

From valve 14, control pressurized-oil line 19 leads to valves 7, 8 and 9 (dashed lines). The tree-feeder motor 5 is between valves 7 and 8. The crosscut-saw motor 6 is between valves 9 and 10. The operating cylinder 18 of the feeder and the limbing blades is connected to valve 15 by means of lines 17 and 16. Valves 7 and 8 are preferably counterbalance valves which can be opened by the control pressure. Valve 9 for its part can preferably be closed by the control pressure, e.g. a seat valve, i.e. through-flow of valve 9 is possible when the control pressure is not effective in line 19.

Valves 10, 11 and 12 are ordinary counterbalance valves. Valves 14 and 15 are electromechanical 2-position direction-control valves. Between lines 13 and 4 there is a pressure-limiting valve 20. This is so because, when a tree is limbed from the top towards the base, while the cylinder 18 is moving towards the open-movement direction, excess oil can pass via line 13 to return line 14 via tne pressure-limiting valve 20. Likewise, the tree-feeder motor 5 is protected by pressure-limiting valve 20. Operation on the basis of the FIG- URE. The gripping of a tree takes place as follows. Pressurized oil is fed along line 2 from the power take-off machine to the tree harvester 1. Along line 2, oil can pass only via valve 8 and counterbalance valve 12 to direction-control valves 14 and 15 along line 13. The pressurized oil can flow further via valve 15 along line 17 into the cylinder 18, which is moving towards the right in the FIGURE.

The movement continues until the feeder rolls and the limbing blades press against the surface of the tree to be handled, i.e. the desired pressure is effective in the cylinder 18; only thereafter can the crosscut sawing or tree feeding be started.

The feeding in of the tree takes place by feeding pressurized oil, for example, via line 3 to the tree harvester 1 and by at the same time energizing valve 14, whereupon pressurized oil passes via line 3, valve 7, counterbalance valve 11 and valve 14 in order to open valves 7 and 8. At the same time, valve 9 closes. Now oil can pass to the tree-feeder motor 5 (there can be several motors), and the motor begins to rotate in the pre-selected direction, thereby feeding in the tree. Via valve 11 and line 13 and valve 15, the pressurized oil in line 3 keeps the cylinder 18 pressurized, and so the tree is held by the feeder rolls and the limbing blades. If it is desired to perform a crosscut sawing, current is cut off from valve 14, whereupon control pressure in line 19 ceases, and at the same time valves 7 and 8 of the tree-feeder motor 5 close. As the pressurized oil continues to have effect in line 3, valve 9 opens and the saw motor 6 starts. At the end of the sawing, valve 14 is again energized, whereupon the valves 7 and 8 of the feeder motor 5 again open and valve 9 closes. By feeding pressurized oil from the power take-off machine into line 2, valve 14 being without current, whereupon valve 9 of the saw 6 is open but counterbalance valve 10 prevents the motor 6 from rotating, pressurized oil passes via counterbalance valve 12 along pipe 13 into valve 15. When not energized, valve 15 closes, and when energized, it opens the feeder and the limbing blades by means of the cylinder 18.

Thus, via two electrical cables and three pressurized-oil pipes, it is possible to control and operate all the functions of the tree-harvester. This, for its part, facilitates and simplifies the coupling of grapple processors to existing forwarders, and also reduces the costs. In many forwarders the feeding of oil into lines 2 and 3 can be carried out by using, for example, the on-off direction-control valve of the grapple. Furthermore, it is possible advantageously to add the electric switches of the two direction-control valves 14 and 15 to the manual lever of this direction-control valve. In the operating system according to the invention, one pressure-limiting valve 20 suffices for protecting the tree-feeder motor 5 and the hydraulic cylinder 18 of the feeder and the limbing blades. This for its part reduces the weight and the space requirement.

I claim:

1. An electrohydraulic operating system for a tree harvester, said system comprising:
 a first and a second pressure oil line, each one capable of serving as a feed line and, alternatively, as a return line, so as to provide for the flow of oil in one or the other direction through said system;
 a first motor for a tree-feeding device, said motor being of a reversible type and connected between the first and second pressure oil lines;
 a second motor for a cutting saw, said motor being of one-directional type and connected between said first and second pressure oil lines;
 power cylinder means for effecting gripping of the tree during feeding and cutting operations;
 first valve means coupled in series with the first motor;
 second valve means coupled in series with the second motor;
 first control means for opening of said first and second valve means alternatively and for preventing simultaneous opening of the first and second valve means; and
 second control means for operating said power cylinder means and for inhibiting operation of the first control means until the power cylinder means has reached a tree-gripping position.

2. Operating system according to claim 1, further comprising a return oil duct essentially smaller than said first and second pressure oil lines and connected to an outlet pipe of the power cylinder means.

3. Operating system according to claim 1, wherein the first control means comprises an electric directional valve controlling said first and second valve means and adapted to connect a controlling oil pressure duct for said first and second valve means alternatively to pressure side pipes of said power cylinder means or to outlet pipes of said power cylinder means.

4. Operating system according to claim 1, wherein the second control means comprises an electrical directional valve.

* * * * *